United States Patent [19]

Wells

[11] 4,230,390

[45] Oct. 28, 1980

[54] DOUBLE ACTION, ELECTRICAL CONNECTOR COUPLING DEVICE

[75] Inventor: Royzell F. Wells, Littleton, Colo.

[73] Assignee: Martin Marietta Corporation, Bethesda, Md.

[21] Appl. No.: 10,345

[22] Filed: Feb. 8, 1979

[51] Int. Cl.[3] .......................... H01R 4/54; F16L 23/00

[52] U.S. Cl. .................................. 339/90 R; 285/353; 285/361

[58] Field of Search ............... 339/75, 90, 89 R, 89 C, 339/90 R, 90 C; 285/353, 361, 376, 384, 396, 402

[56] References Cited

U.S. PATENT DOCUMENTS

| | | | |
|---|---|---|---|
| 3,835,443 | 9/1974 | Arnold | 339/90 R |
| 3,848,950 | 11/1974 | McCormick | 339/90 R |

*Primary Examiner*—Neil Abrams
*Assistant Examiner*—John S. Brown
*Attorney, Agent, or Firm*—Sughrue, Rothwell, Mion, Zinn and Macpeak

[57] ABSTRACT

A tubular female receptacle receives the projecting end of a cylindrical male plug shell having a radial shoulder intermediate of its ends, which bears against the end face of the receptacle. The plug shell carries a tubular coupling ring with cam grooves in its inner surface to act against bayonet pins mounted to the periphery of the receptacle. When the coupling ring is rotated onto the receptacle the cam grooves and bayonet pins cause the coupling ring to advance axially over the receptacle, and because the coupling ring is carried by the plug shell, the coupling ring causes the plug shell to advance into the receptacle. The cam grooves must necessarily end in detents to prevent the bayonet pins from backing down the ramps defined by the grooves. A threaded fitting threaded into the back end of the coupling ring is tightened into the coupling ring to lock the bayonet pins in the detents and at the same time to rigidly lock the plug shell, via its radial shoulder, to the receptacle, in metal-to-metal contact with the same.

10 Claims, 4 Drawing Figures

DOUBLE ACTION, ELECTRICAL CONNECTOR COUPLING DEVICE

This application relates to copending application Ser. No. 010344 filed Feb. 8, 1979 by Royzell F. Wells, and entitled "AXIAL TUBE CUTTER FOR SEVERING ELECTRICAL CONNECTOR COUPLING RINGS".

FIELD OF THE INVENTION

This invention relates to axial, two part cylindrical connectors, and more particularly, to bayonet coupled type electrical connectors.

BACKGROUND OF THE INVENTION

Axial, cylindrical component connectors of many types are in use today for forming mechanical connections between mating electrical contacts, hose connections or conduit connections for fluid systems, or tubular connectors for connecting componentry of optical or optical electrical circuits. In aerospace and military applications, the most common electrical connector is the bayonet coupled, cylindrical connector. This connector uses a bayonet coupling ring, wherein three circumferentially spaced cam grooves inside the rotary coupling ring, on the plug half, engage three bayonet pins secured to or projecting from the circumference of the receptacle to advance the plug half into the receptacle, when the coupling ring is rotated. While this provides very rapid engagement and disengagement of the plug relative to the receptacle, the ends of the cam grooves must necessarily include detents to prevent the bayonet pins from backing down the ramps defined by the cam grooves, and the coupling ring thus requires a spring to bias and hold the bayonet pins within the detents. The spring also accommodates the manufacturing tolerances in the receptacle, plug shell and coupling ring. Thus, the plug shell or body is held in the receptacle of tubular form by a spring rather than being firmly locked to the receptacle and prevented from axial and transverse movement.

The U.S. Pat. No. for the bayonet coupled electrical connector 2,984,611-May 16, 1961 to Hennessey et al, describes a mated condition of a plug and receptacle such that the external shoulder on the plug shell is butted against the nose of the receptacle while at the same time the plug insert is in face-to-face sealing with the receptacle insert. The fact is that over the years the interfacial sealing has become an overriding consideration, and now an elastomeric seal is employed between the two inserts, preventing the abutment of the plug shell shoulder against the nose of the receptacle. This essentially causes the plug shell to be suspended between two springs, that is, between the springiness of the elastomeric seal at the face of the plug insert and the wave spring behind the plug shell shoulder. There is, therefore, considerable relative motion possible between the plug shell and the receptacle.

The spring held plug shell approach, while being satisfactory in many applications, is not adequate in environments of very high vibration and shock or in moderate vibration over a long duration. In a space launch vehicle program, a problem of electrical failures was encountered with bayonet coupled connectors during the qualification testing of devices that employ bayonet coupled connectors. The devices were the electro-explosive separation nuts used on the Titan III launch vehicle at the stage 0 to 1, 1 to 2 and 2 to 3 separation interfaces. The qualification tests included subjecting ten separation nuts including the mating electrical connector plugs to extreme mechanical shock and random vibration environments. After completion of the environmental tests, it was found that several the electrical pin male contacts in the connectors were broken and there was severe damage to the plug coupling ring and the receptacle bayonet pins.

Failure analysis of the connectors concluded that the broken electrical pins, and the damage, were caused by the relative motion that occurred between the plug shell and the receptacle during the application of the shock and random vibration environments. It was further determined that the spring member would have to be removed from the coupling ring design and that the plug body would have to be rigidly connected to the receptacle in order for the connectors to survive the extreme environments.

There are approximately five hundred wired and potted separation nut connector plugs that have already been installed and electrically tested on existing Titan IIIC and IIID launch vehicles. There is a need for replacement coupling rings, or else the entire connector plugs will have to be cut off and replaced and retested.

There is another very strong trend in this electronics age towards the insuring of electrical grounding between electrical connector plugs and their mating receptacles. This is necessary because as the electrical circuits become more and more complex, the RFI or EMC shielding protection becomes more compelling. Because of the relative motion allowable between the plug shell and the receptacle in the spring loaded bayonet coupled connector, the common method of electrically grounding the plug shell to the receptacle in these connectors is by adding a ring of electrically conductive spring fingers in between the plug shell and the receptacle. The ring of spring fingers is installed in a groove on the outer cylindrical nose portion of the plug shell. After the plug shell nose enters the receptacle, the spring fingers also enter the receptacle, and wipe against the inner wall of the receptacle as the mating is completed. Because the spring fingers are so fragile, and because the inner wall of the receptacle contains keyways, there are many problems associated with the spring finger method of grounding. There is a need for a more rugged, reliable, and less expensive means of grounding plug shells to receptacles.

There are a number of new connectors being offered today. Some are supposed improvements to the bayonet coupled connector, and some include entirely different coupling mechanisms. None of the improved bayonet coupled connectors include true metal to metal locking of the plug shell to the receptacle, and most are not useable on existing plug shells. The new coupling mechanisms require complete changeover of both the plugs and the receptacles. This proliferation is greatly increasing the cost to the military and to the air lines for provisioning the many different connectors.

It is, therefore, a primary object of this invention to provide a bayonet coupling ring for mating connector plugs to receptacles, in which; the coupling ring does not employ a spring member, is intermateable with existing bayonet receptacles; is usable with existing bayonet coupled connector plug shells; positively locks the plug shell metal-to-metal to the receptacle and positively electrically grounds the plug shell to the receptacle.

It is a further object of the present invention to provide a replaceable coupling ring for a conventional bayonet coupled electrical connector plug and receptacle which combines rapid mechanical assist engagement with a final, secure lock up of the plug to the receptacle and which may be readily applied to existing, wired plug shells in place of the conventional coupling rings.

SUMMARY OF THE INVENTION

The invention has application to a connector of the bayonet coupled type comprising a cylindrical female receptacle including a projecting axial tubular portion having bayonet pins projecting radially outwardly of the tubular portion outer periphery, and a male plug which includes a cylindrical plug shell, with the plug shell including a radial shoulder intermediate of its ends. The outer diameter of the shoulder is greater than the inner diameter of the tubular portion of the receptacle, so as to abut the end of the receptacle tubular portion when the plug shell is inserted into the receptacle.

The plug shell carries a tubular coupling ring, a portion of which surrounds the tubular portion of the receptacle while the receptacle and plug are engaged or mated. The inside surface of the coupling ring contains cam grooves which in cooperation with the bayonet pins on the receptacle, causing the coupling ring to advance axially over the receptacle shell when the coupling ring is rotated about the receptacle shell. The coupling ring, being carried by the plug shell, causes the plug shell to advance into the receptacle shell.

The improvement in the coupling ring resides in the end opposite the receptacle. The conventional coupling ring employs a wave or sinusoidal spring, between an internal shoulder of the coupling ring and the external shoulder of the plug shell, to maintain the receptacle bayonet pins detented in the detents of the coupling ring cam grooves and to accommodate the axial manufacturing tolerances that accumulate among the plug shell, coupling ring, and receptacle. Instead of the wave spring, the improved device employs a threaded fitting at the rear of the coupling ring to accommodate the manufacturing tolerances and to force the plug shell shoulder into metal-to-metal contact against the receptacle nose.

The fitting has external threads which thread into internal threads located at the rear of the coupling ring. The inside diameter of the rear fitting is smaller than the outside diameter of the shoulder of the plug shell such that the fitting bears against the shoulder. With the fitting partially threaded into the coupling ring, the plug is mated to the receptacle in the normal manner by rotating the coupling ring over the receptacle until the receptacle bayonet pins detent at the ends of the cam grooves. The fitting is then further threaded into the coupling ring until the shoulder of the shell is firmly clamped between the fitting and the nose of the receptacle. The fitting must be installed over the rear of the plug shell before the wires are terminated to the electrical contacts and before any accessory is threaded onto the rear of the plug shell.

A second design of the invention is replaceable onto the plug shell, after the original coupling ring has been removed. In this design, the inside diameter of the threaded fitting is large enough to pass over the plug shell shoulder. The fitting is slid over the plug shell shoulder from the front, and then a split thrust washer, having an inside diameter smaller than the outside diameter of the plug shell shoulder, is "walked" over the shoulder to nest behind the shoulder. The coupling ring is then slid over the plug shell and the split washer and partially threaded onto the rear fitting. In this design, after mating, the plug shell shoulder is clamped between the split washer and the nose of the receptacle by the threaded rear fitting. Preferably, the outer periphery of the coupling ring and the outer periphery of the fitting are knurled to facilitate rotating the coupling onto the receptacle and the threading of the fitting relative to the ring to threadably lock the connector plug to the receptacle.

BRIEF DESCRIPTION OF THE DRAWINGS

In the figures, like elements bear like numerals.

DESCRIPTION OF THE PREFERRED EMBODIMENTS

Figure 1:
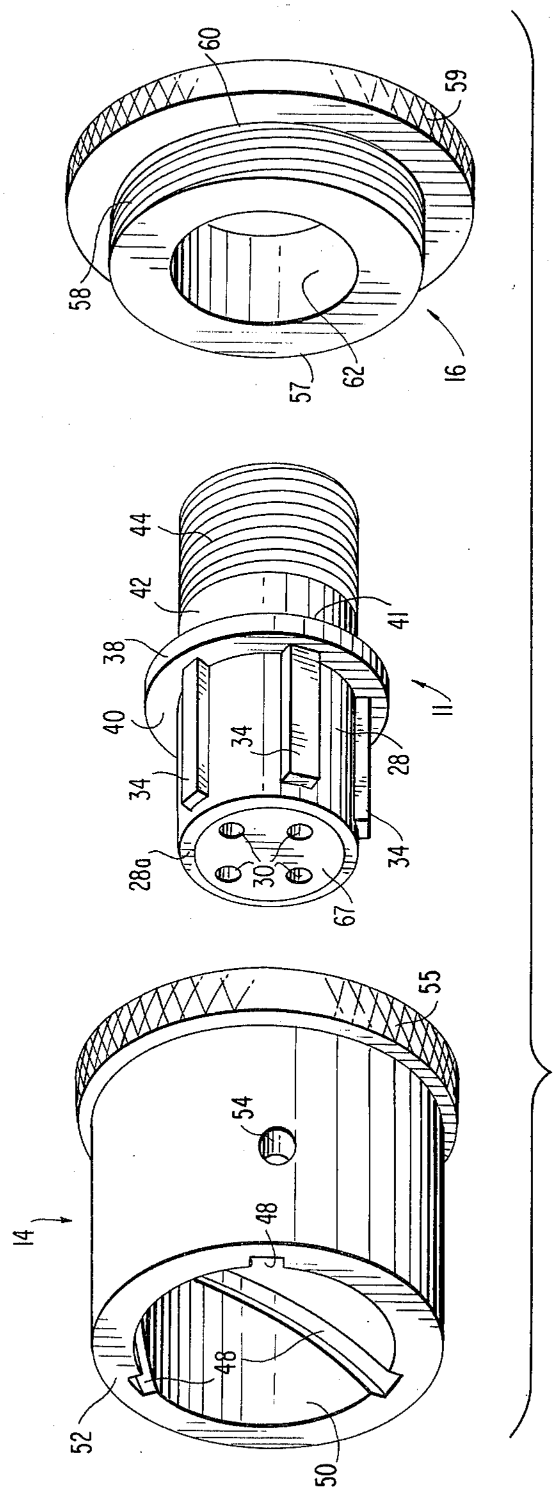
FIG. 1 is an exploded perspective view of the first emobdiment and is of the male electrical connector plug shell and the improved double action electrical connector coupling device of the present invention in a preferred form.

The double action electrical connector coupling device of the present invention is shown in the drawings as having application to a conventional bayonet type electrical connector. The connector is comprised of two major components or members. The receptacle or female member is indicated generally at 10, FIG. 2, the plug or male member is indicated generally at 12, FIG. 1. The electrical connector plug shell assembly indicated generally at 11, FIG. 1, bears a special double action coupling ring indicated generally at 14 which has threaded thereto a fitting 16. The components 14 and 16 constitute, in the first embodiment, the elements of the double action connector coupling device 19 of the present invention. The receptacle 10 is essentially of cylindrical form and includes a radial projecting mounting shoulder 20 intermediate of its ends and separating the threaded accessory end 22 from a tubular portion 24 which defines an internal cylindrical cavity 26 receiving a projecting, cylindrical portion 28 of the plug shell assembly 11. The plug shell 11 bears an insert 67 which contains a number of female electrical contacts 30 which receive projecting male contacts 32 borne by the receptacle 10. The male contacts 32 are borne by the insert 65 inside the receptacle 10 and are surrounded by the interfacial seal 66 at the bottom of the tubular portion 24 of the receptacle. The cylindrical mating end portion 28 of the plug shell assembly 11 bears five circumferentially spaced and longitudinally extending ribs or keys 34 which are received within longitudinal slots or keyways 35 formed within the cavity 26 of receptacle 10. The plug shell assembly 11 includes on its outer periphery a radial projection or shoulder 38 forming a radial face 40 on the side facing the end of the shell assembly 11 bearing the female contacts 30. The portion 42 of the shell to the right of the shoulder 38, FIG. 1, is threaded on its outer periphery as at 44 to receive connector accessories such as potting cups or cable strain reliefs.

The tubular portion 24 of the receptacle 10 bears on its outer periphery three bayonet pins 46 which are circular in cross-section and project radially from that outer periphery, the pins 46 being equally circumferentially spaced at 120°. Cam grooves 48 are formed within the inner periphery 50 of the coupling ring 14, starting from end 52 of that member, the grooves terminating in detents as at 54 in a conventional sense.

The front part of the coupling ring 14 is of standard design for bayonet coupling rings in all respects. The double action coupling device 19 of the present invention is characterized by the coupling ring 14 being modified at its rear, that is, its inner periphery 50 is of enlarged diameter as at 50*a*, at the rear of the coupling ring and in the vicinity of an outer peripheral knurled collar 55. Further, this inner peripheral portion 50*a* bears fine internal threads as at 56 which engage with threads 58 carried on the outer periphery of the forward or front, projecting portion 60 of the threaded fitting 16. The rear portion of the fitting 16 has an enlarged diameter 59 which is knurled on its outer periphery.

The double action coupling ring is intermateable with existing, standard bayonet coupled electrical connector receptacles and is installable onto the plug shells of existing standard bayonet coupled electrical connector plugs.

The plug 12, with the double action coupling ring 19 installed, is initially mated to the receptacle 10 in the normal manner for bayonet coupled connectors. The nose 28*a* of the plug shell 11 is inserted into the receptacle cavity 26 far enough to allow the cam grooves 48 of the coupling ring 14 to be engaged on the receptacle bayonet pins 46. With the fitting 16 partially threaded into the coupling ring 14, the coupling ring is then rotated clockwise until the bayonet pins 46 drop into the detents 54 at the ends of the cam grooves 48. The cam grooves 48 cause the coupling ring to advance axially onto the receptacle tubular portion 24 and at the same time the fitting 16 pushes the plug shell 11 into more complete engagement with the receptacle 10, causing the pin contacts 32 to enter the socket contacts 30. The mating is completed by tightening the threaded fitting 16 into the copuling ring 14. The threaded tightening causes metal-to-metal mating of the plug to the receptacle because the coupling ring 14 is locked (detented by detents 54) on the bayonet pins 46 and the nose 57 of the threaded fitting bears against the plug shell shoulder 38 face 41 and, in turn, the opposite face 40 of the shoulder bears against the nose 24*a* of the receptacle. At the same time, the tightening also completes the inerfacial sealing between the plug and the receptacle by pressing the plug insert 67 and the face 28*a* of the plug shell against the interfacial seal 66.

The threaded fitting causes the receptacle bayonet pins to be locked in the detents of the coupling ring without the use of a spring. The fitting also causes permanent electrical contact between the plug shell and the receptacle.

Figure 2:
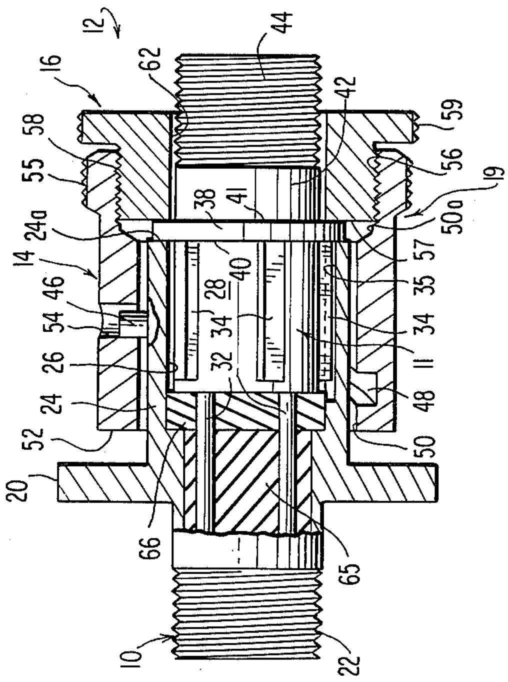
FIG. 2 is a sectional elevational view of the first embodiment and is of an electrical connector including the male plug shell and the improved double action coupling device of FIG. 1, with the plug mated to its receptacle in the mechanically locked position.

It is important to note that in the first embodiment of the invention, FIGS. 1 and 2, that the inner diameter 62 of the threaded fitting 16 is smaller than the outside diameter of the shoulder 38 of the plug shell 11. In fact, the inner diameter 62 is only large enough to pass over the accessory end 42 of the plug shell, such that when the fitting 16 is pushed against the plug shell shoulder 38, the flat nose 57 of the fitting bears against almost the total radial face 41 of the shoulder. This fitting 16 must be installed over the accessory end 42 of the plug shell 11 before the wires are terminated in the contacts and before any accessory (potting cup, cable strain relief, or the like) is threaded onto the accessory threads 44.

Figure 3:
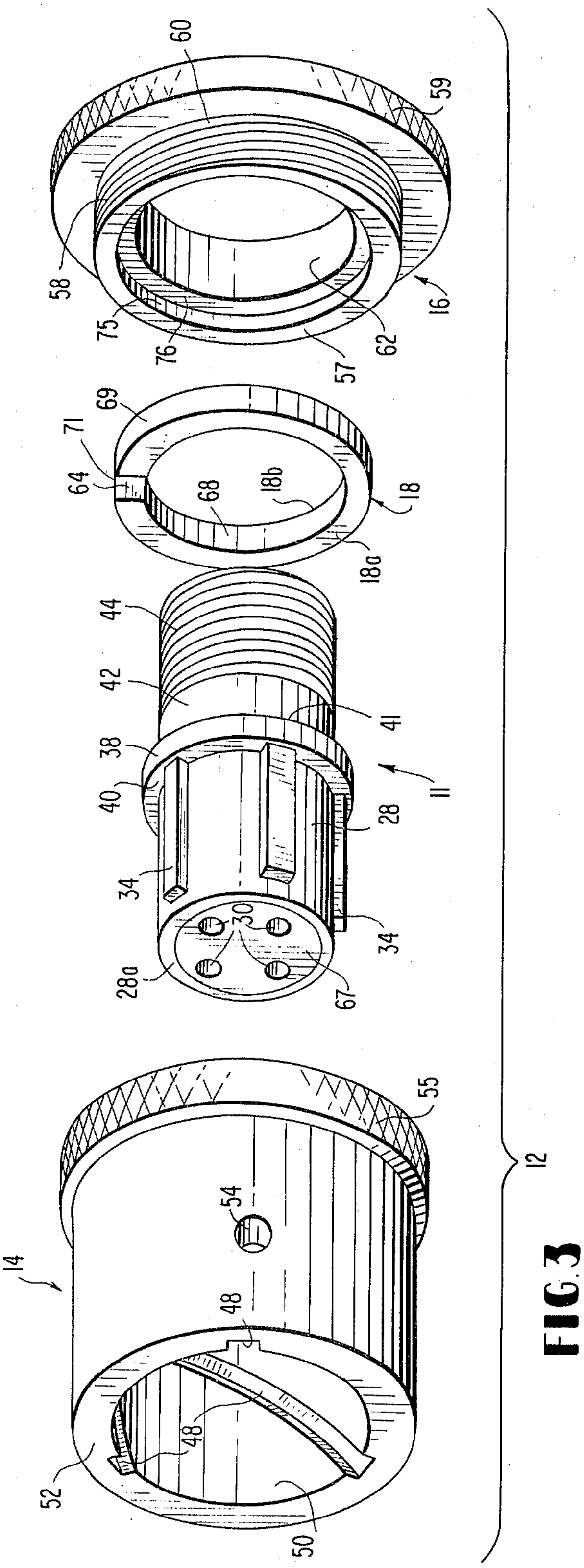
FIG. 3 is an exploded perspective view of the second embodiment and is of the male electrical connector plug shell and the improved double action electrical connector coupling device of the present invention in its replaceable form.
Figure 4:
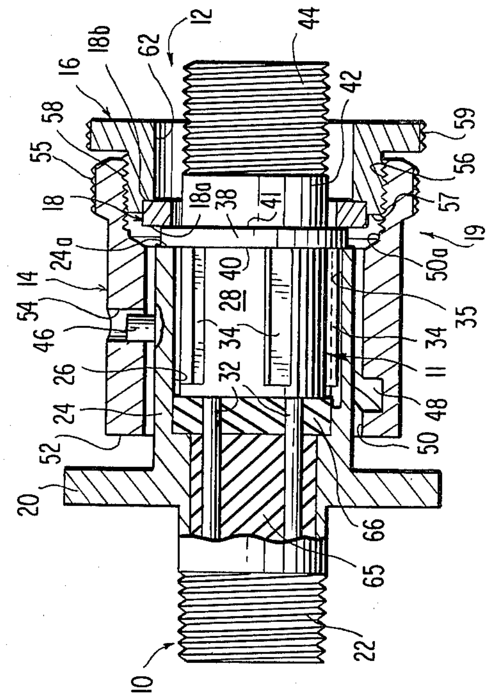
FIG. 4 is a sectional elevational view of the second embodiment and is of an electrical connector including the male plug shell and the improved double action coupling device, with the plug mated to its receptacle in the mechanically locked position.

The second embodiment of the present invention, FIGS. 3 and 4, is functionally the same as the first embodiment, and mating it to the receptacle is identical with mating the first embodiment. The second embodiment is intended for use on previously wired connector plugs where there is no access over the back end of the plug shell. The original (O.E.M) coupling ring, wave spring(s), and any thrust washers are cut off of the plug shell prior to installing the second embodiment. The second embodiment may be used as an original equipment coupling ring, but it employs a third member and is more expensive than necessary for such application.

In the figures, the same identifying numbers are used for the same parts and features between FIGS. 1 and 2, the first embodiment, and FIGS. 3 and 4, the second embodiment.

It is important to note that in the second embodiment the inside diameter 62 of the threaded fitting 16 is slightly larger than the outside diameter of the shoulder 38 on the plug shell 11, so as to permit the installation of the fitting over the shoulder from the front 28 of the plug shell. This fitting also includes a recess 75 in the nose 57 at the inside diameter 62 of the fitting. This recess is for the installation of the rectangular cross-sectioned, springlike, split thrust washer 18. The washer 18 slotted at 64, has an inside diameter 68 equal to or slightly larger than the diameter over of the keys 34 of the plug shell, an outside diameter 69 equal to or slightly larger than the diameter of the recess 75 in the threaded fitting, and a thickness 71 equal to or slightly larger than the depth of the recess 75. The components 14, 16 and 18 constitute the elements of the double action connector coupling device in the second embodiment of the present invention.

To install the second embodiment of the double action coupling device on a previously wired plug shell, the threaded fitting 16 is first slid over the plug shell 11 and its shoulder 38 from the front portion 28 of the plug shell, with the nose 57 of the fitting facing the front portion of the plug shell. Next, the split washer 18 is slid over the nose portion 28 and the keys 34 of the plug shell 11 until the washer abutts the flange 38, and then starting with one end of the washer, the washer is "walked" completely over the shoulder until it is free, behind face 41 of the shoulder. The split washer 18 is then pressed into the recess 75 of the rear fitting 16 until the face 18*b* of the washer bottoms against the face 76 of the recess. Finally, the coupling ring 14 is slid over the plug shell 11 and partially threaded onto the threads 58 of the rear fitting 16. The plug assembly is now ready for mating with its receptacle, and it is mated and tightened to the receptacle in the same manner as the first embodiment.

In the second embodiment of the double action coupling ring, the plug shell is locked metal-to-metal to the receptacle by the split washer, i.e., the coupling ring is locked (detented) by detents 54) on the bayonet pins 46 and the face 76 of the recess 75 in the threaded fitting 16 bears against the face 18_b_ of the split washer 18, the opposite face 18_a_ of the split washer bears against the back face 41 of the plug shell shoulder 38 and the front face 40 of the plug shell shoulder 38 bears against the nose face 24_a_ of the receptacle. Again, the tightening also completes the sealing at the interfacial seal 66.

In the second embodiment, because the split washer must be slid over the keys 34 and "walked" over the shoulder 38 of the plug shell 11, its inside diameter is such that the face 18_a_ of the washer bears against approximately 70 percent of the face 41 of the plug shell shoulder. For this reason, the outside diameter 69 of the split washer is a snug fit in the inside diameter 75 of the recess in the threaded fitting; in order to hold the split washer concentric with the assembly and to prevent the washer from becoming eccentric with respect to the plug shell shoulder 38 and "walking" back over the shoulder during the tigtening of the threaded fitting.

In both the embodiments of the double action coupling ring, the coupling ring may be secured against thread loosening during vibration by applying LOCTITE to the last thread(s) before tightening the threaded sitting; or, after tightening the fitting by applying a bead of resilient adhesive sealant between the knurled shoulder of the threaded fitting and the coupling ring, for part of the circumference around the coupled device.

It should be apparent from the above description that the improved double action connector coupling device has special application to multi-contact electrical connectors where the operational environment is severe with respect to vibration, shock, sealing, etc. However, the invention has more general application to quick coupling between axial elements which require secure joints and fast coupling for mechanical, fluid and electrooptical systems.

While the invention has been particularly shown and described with reference to preferred embodiments thereof, it will be understood by those skilled in the art that the foregoing and various other changes in form and details may be made therein without departing from the spirit and scope of the invention.

What is claimed is:

1. In a connector comprising a cylindrical female receptacle member including a tubular portion, a cylindrical male plug member including a plug shell received within said receptacle member tubular portion, and wherein one of said members bears at least one bayonet pin which projects radially from said one member and is received within a bayonet cam groove on the opposed periphery of the other member, and wherein said plug shell bears a radial shoulder intermediate of its ends, said radial shoulder having an outer diameter in excess of the inner diameter of the receptacle member tubular portion so as to abut the nose of the tubular portion, said plug member including a coupling ring concentrically carried by said male plug member and having a portion concentrically surrounding said receptacle and forming the bayonet connection with said receptacle member, and said shoulder having an outer diameter less than the inner diameter of said coupling ring, the improvement comprising:

the end of said coupling ring remote from said receptacle member being fine threaded on its inner periphery, and a cylindrical fitting fine threaded on its outer periphery and being threaded to the inner periphery of said ring, said fitting having a nose at one end and an inner diameter less than the diameter of said plug shell shoulder but greater than the outer diameter of said plug shell proper, such that the nose of said fitting bears on said shoulder, and said shell shoulder bears on the nose of the receptacle tubular portion for fine threaded metal-to-metal locking of said plug member to said receptacle member to effect constant electrical grounding of said plug shell to said female receptacle member.

2. The connector as claimed in claim 1, wherein both said coupling ring and said fitting have knurled collars to facilitate first rotation of said coupling ring and said fitting jointly to effect bayonet coupling between said coupling ring and said receptacle member, and, secondly, rotation of said fitting relative to said coupling ring to threadably lock said male plug member against said receptacle member and within said receptacle member tubular portion.

3. The connector as claimed in claim 1, wherein said coupling ring has a threaded, enlarged inner diameter portion at said end bearing said threaded fitting and said fitting terminates in a radially outward collar knurled on its outer periphery, and wherein said coupling ring is knurled at said threaded end with said knurled collars being generally of equal diameter to facilitate first rotation of the coupling ring and the fitting jointly to effect bayonet coupling between said coupling ring and said receptacle member, and, secondly, rotation of said fitting relative to said ring to threadably lock the male plug member against the receptacle member and within the receptacle member tubular portion.

4. In a connector comprising a cylindrical female receptacle member including a tubular portion which receives a projecting end of a cylindrical male plug member including a plug shell received within said receptacle member tubular portion, and wherein one of said members bears at least one bayonet pin which projects radially from said one member and is received within a bayonet cam groove on the opposed periphery of the other member, and wherein said plug shell bears a radial shoulder intermediate of its ends, said radial shoulder having an outer diameter in excess of the inner diameter of the receptacle member tubular portion so as to abut the nose of the tubular portion, said plug member including a coupling ring concentrically carried by said male plug member and having a portion concentrically surrounding said receptacle and forming the bayonet connection with said receptacle member, and said shoulder having an outer diameter less than the inner diameter of said coupling ring, the improvement comprising:

the end of said coupling remote from said receptacle member being fine threaded on its inner periphery, a split washer installable onto said plug shell from the front of said plug shell, being located behind the plug shell shoulder and having an inner diameter in excess of said plug shell proper but less than the outer diameter of said plug shell shoulder and having an outer diameter in excess of said plug shell shoulder, and a cylindrical fitting fine threaded on its outer periphery and being threaded to the inner periphery of said ring, said fitting having a nose at one end and an inner diameter in excess of the diameter of said plug shell shoulder, but less than the outer diameter of the plug shell proper, and the nose of said fitting being recessed at its inner periphery so as to receive said split washer and hold it concentric with the fitting, such that after said plug is mated to said receptacle and said fitting is further threaded to said ring, the fitting abuts the split washer, the split washer abuts the plug shell shoulder, and the plug shell shoulder abuts the nose of said receptacle tubular portion, so as to cause metal-to-metal locking of said plug shell to said receptacle member.

5. The connector as claimed in claim 4, wherein both said coupling ring and said fitting have knurled collars to facilitate first rotation of said coupling ring and said fitting jointly to effect bayonet coupling between said coupling ring and said receptacle member, and, secondly, rotation of said fitting relative to said coupling ring to threadably lock said male plug member against said receptacle member and within said receptacle member tubular portion.

6. The connector as claimed in claim 4, wherein said coupling ring has a threaded enlarged inner diameter portion at said end bearing said threaded fitting, and said fitting terminates in a radially outward collar, knurled on its outer periphery, and said coupling ring is knurled at said threaded end with said knurled collars being generally of equal diameter to facilitate first rotation of the coupling ring and the fitting jointly to effect bayonet coupling between the coupling ring and said receptacle member, and secondly, rotation of said fitting relative to said ring to threadably lock the male plug member against the receptacle member and within the receptacle member tubular portion.

7. The connector as claimed in claim 4, wherein the longitudinal depth of the recess of said fitting is less than the axial thickness of the split washer, such that the split washer projects axially outward of said recess and abuts said plug shell shoulder.

8. A double action electrical connector coupling device for an electrical connector comprising a cylindrical female receptacle including a tubular portion receiving a projecting end of a cylindrical male plug including a plug shell received within said receptacle tubular portion, said receptacle tubular portion bearing at least one bayonet pin projecting radially outwardly thereof, a coupling ring concentrically carried by said male plug member and having a portion concentrically surrounding said receptacle and a bayonet cam groove within the inner periphery of said coupling ring portion and receiving said at least one bayonet pin, said plug shell bearing a radial shoulder intermediate of its ends with said radial shoulder having an outer diameter in excess of the inner diameter of the receptacle tubular portion so as to abut the nose of the tubular portion but having an outer diameter less than the outer diameter of said ring, said device comprising:

the end of said ring remote from said receptacle member being fine threaded on its inner periphery, a split washer installable onto said plug shell from the front of said plug shell, being located behind the plug shell shoulder and having an inner diameter in excess of said plug shell proper but less than the outer diameter of said plug shell shoulder and having an outer diameter in excess of said plug shell shoulder, and a cylindrical fitting fine threaded on its outer periphery and being threaded to the inner periphery of said ring, said fitting having a nose at one end and an inner diameter in excess of the diameter of said plug shell shoulder, but less than the outer diameter of the plug shell proper, and the nose of said fitting being recessed at its inner periphery so as to receive said split washer and hold it concentric with the fitting, such that after said plug is mated to said receptacle and said fitting is further threaded to said ring, the fitting abuts the split washer, the split washer abuts the plug shell shoulder, and the plug shell shoulder abuts the nose of said receptacle tubular portion, so as to cause metal-to-metal locking of said plug shell to said receptacle member.

9. The double action electrical connector coupling device as claimed in claim 8, wherein said fitting terminates in a radially projecting knurled collar axially beyond the end of said ring, and said ring is knurled at said threaded end and of corresponding diameter to facilitate, first, rotation of said ring and said fitting jointly to effect bayonet coupling between said ring and said receptacle, and, secondly, rotation of said fitting relative to said ring to fine threadably lock said male plug against said receptacle and within said receptacle tubular portion.

10. The double action electrical connector coupling device as claimed in claim 8, wherein the axial depth of said recess is less than the thickness of said split washer, such that said split washer projects axially beyond said nose and abuts said plug shell shoulder.

* * * * *